(12) United States Patent
Carter et al.

(10) Patent No.: US 9,292,161 B2
(45) Date of Patent: Mar. 22, 2016

(54) POINTER TOOL WITH TOUCH-ENABLED PRECISE PLACEMENT

(75) Inventors: Benjamin F. Carter, Redmond, WA (US); Priyanka Singhal, Bellevue, WA (US); Shawna Julie Davis, Seattle, WA (US); Tirthankar Sengupta, Redmond, WA (US); Jeffrey Cheng-Yao Fong, Seattle, WA (US); Ryan Terry Bickel, Kirkland, WA (US); Peter Gregory Davis, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 12/731,061

(22) Filed: Mar. 24, 2010

(65) Prior Publication Data

US 2011/0239153 A1 Sep. 29, 2011

(51) Int. Cl.
*G06F 3/048* (2013.01)
*G06F 3/0481* (2013.01)
*G06F 3/0488* (2013.01)

(52) U.S. Cl.
CPC ........ *G06F 3/04812* (2013.01); *G06F 3/04883* (2013.01)

(58) Field of Classification Search
CPC ................. G06F 3/04812; G06F 3/04883
USPC ................................ 715/784, 856
See application file for complete search history.

(56) References Cited

U.S. PATENT DOCUMENTS

| | | | | |
|---|---|---|---|---|
| 4,190,835 A | * | 2/1980 | Buynak | 345/551 |
| 4,633,432 A | * | 12/1986 | Kitamura | 715/201 |
| 4,698,625 A | * | 10/1987 | McCaskill et al. | 345/157 |
| 4,739,314 A | * | 4/1988 | McCaskill et al. | 715/856 |
| RE32,773 E | * | 10/1988 | Goldwasser et al. | 715/205 |
| 4,786,894 A | * | 11/1988 | Furusawa et al. | 345/160 |
| 5,051,930 A | * | 9/1991 | Kuwabara et al. | 715/207 |
| 5,070,478 A | * | 12/1991 | Abbott | 715/210 |
| 5,122,953 A | * | 6/1992 | Uekusa et al. | 715/210 |
| 5,164,713 A | * | 11/1992 | Bain | 715/862 |
| 5,581,670 A | * | 12/1996 | Bier et al. | 715/856 |
| 5,583,981 A | * | 12/1996 | Pleyer | 715/800 |
| 5,655,093 A | * | 8/1997 | Frid-Nielsen | 715/856 |
| 5,666,139 A | * | 9/1997 | Thielens et al. | 345/173 |
| 5,666,552 A | * | 9/1997 | Greyson et al. | 715/210 |
| 5,714,971 A | * | 2/1998 | Shalit et al. | 715/804 |

(Continued)

FOREIGN PATENT DOCUMENTS

WO WO 2010/135127 11/2010

OTHER PUBLICATIONS

Hillebrand, "How to Make your Windows Mobile Touch Screen Finger-Friendly," Published Date: Apr. 22, 2008, <http://www.mobilitysite.com/2008/04/how-to-make-your-windows-mobile-touch-screen-finger-friendly/>, 4 pages (retrieved Mar. 24, 2010).

(Continued)

*Primary Examiner* — Jessica Chuang
(74) *Attorney, Agent, or Firm* — Judy Yee; Micky Minhas

(57) ABSTRACT

A pointer tool in a touch-screen display is disclosed. The method includes activating a pointer tool in a touch screen display in response to contact with an area of the touch screen and persisting the displaying of the pointer tool in the touch screen display after the contact with the touch screen is removed. Once editing data is received, the pointer tool is removed from the touch screen display.

18 Claims, 12 Drawing Sheets

(56) References Cited

U.S. PATENT DOCUMENTS

| | | | |
|---|---|---|---|
| 5,754,737 A * | 5/1998 | Gipson | 706/11 |
| 5,778,404 A * | 7/1998 | Capps et al. | 715/234 |
| 5,798,752 A * | 8/1998 | Buxton et al. | 715/863 |
| 5,825,352 A * | 10/1998 | Bisset et al. | 345/173 |
| 5,857,212 A * | 1/1999 | Van De Vanter | 715/234 |
| 5,905,486 A * | 5/1999 | Brittenham et al. | 345/157 |
| 5,917,476 A * | 6/1999 | Czerniecki | 345/173 |
| 6,049,326 A * | 4/2000 | Beyda et al. | 345/157 |
| 6,057,827 A * | 5/2000 | Matthews | 345/420 |
| 6,115,482 A * | 9/2000 | Sears et al. | 382/114 |
| 6,137,472 A * | 10/2000 | Pekelney et al. | 715/858 |
| 6,204,848 B1 * | 3/2001 | Nowlan et al. | 715/810 |
| 6,232,969 B1 * | 5/2001 | Fawcett | 345/467 |
| 6,310,610 B1 * | 10/2001 | Beaton et al. | 345/173 |
| 6,313,836 B1 * | 11/2001 | Russell, Jr. | G06F 3/04812 345/419 |
| 6,340,967 B1 * | 1/2002 | Maxted | 345/179 |
| 6,360,237 B1 * | 3/2002 | Schulz et al. | 715/255 |
| 6,396,474 B1 * | 5/2002 | Johnson et al. | 715/856 |
| 6,489,981 B1 * | 12/2002 | Jones | 715/862 |
| 6,661,965 B2 * | 12/2003 | Yamamoto | 386/279 |
| 6,677,928 B1 * | 1/2004 | Brodey et al. | 345/156 |
| 6,683,627 B1 * | 1/2004 | Ullmann et al. | 715/786 |
| 6,693,653 B1 * | 2/2004 | Pauly | 715/857 |
| 6,714,218 B1 * | 3/2004 | Bian | 715/764 |
| 6,714,221 B1 * | 3/2004 | Christie et al. | 715/784 |
| 6,854,090 B2 * | 2/2005 | Yu | 715/840 |
| 6,927,783 B1 * | 8/2005 | MacInnis et al. | 345/629 |
| 6,986,106 B2 * | 1/2006 | Soin et al. | 715/271 |
| 7,006,074 B2 * | 2/2006 | Chesters | 345/156 |
| 7,024,623 B2 * | 4/2006 | Higashiyama et al. | 715/245 |
| 7,030,861 B1 * | 4/2006 | Westerman et al. | 345/173 |
| 7,032,171 B1 * | 4/2006 | Carroll | 715/246 |
| 7,075,512 B1 | 7/2006 | Fabre et al. | |
| 7,091,954 B2 * | 8/2006 | Iesaka | 345/168 |
| 7,098,933 B1 * | 8/2006 | Thoemmes et al. | 345/677 |
| 7,113,178 B1 * | 9/2006 | Webb | G06F 3/04883 345/173 |
| 7,149,550 B2 | 12/2006 | Kraft et al. | |
| 7,177,797 B1 | 2/2007 | Micher et al. | |
| 7,355,583 B2 * | 4/2008 | Beardsley et al. | 345/156 |
| 7,356,760 B2 * | 4/2008 | Jaeger | 715/246 |
| 7,380,203 B2 * | 5/2008 | Keely et al. | 715/230 |
| 7,423,659 B1 * | 9/2008 | Pratley et al. | 345/660 |
| 7,456,850 B2 * | 11/2008 | Meier et al. | 345/684 |
| 7,489,306 B2 * | 2/2009 | Kolmykov-Zotov et al. | 345/173 |
| 7,586,481 B1 * | 9/2009 | Paquette et al. | 345/157 |
| 7,605,804 B2 * | 10/2009 | Wilson | 345/173 |
| 7,761,807 B2 * | 7/2010 | Tapuska | 715/788 |
| 7,856,605 B2 * | 12/2010 | Ording et al. | 715/856 |
| 7,916,157 B1 * | 3/2011 | Kelley et al. | 345/660 |
| 7,954,054 B2 * | 5/2011 | Iwema et al. | 715/256 |
| 7,966,578 B2 * | 6/2011 | Tolmasky et al. | 715/863 |
| 8,074,181 B2 * | 12/2011 | Zaman et al. | 715/784 |
| 8,117,034 B2 * | 2/2012 | Gschwendtner | 704/260 |
| 8,176,438 B2 * | 5/2012 | Zaman et al. | 715/815 |
| 8,299,943 B2 | 10/2012 | Longe | |
| 8,319,728 B2 * | 11/2012 | Geffin et al. | 345/157 |
| 8,446,392 B2 * | 5/2013 | Wang et al. | 345/175 |
| 8,566,751 B2 * | 10/2013 | Kelley et al. | 715/857 |
| 8,614,665 B2 * | 12/2013 | Li | 345/156 |
| 8,656,282 B2 * | 2/2014 | Kulas | 715/723 |
| 8,656,296 B1 * | 2/2014 | Ouyang et al. | 715/770 |
| 8,656,315 B2 * | 2/2014 | Kirkpatrick | 715/863 |
| 8,826,190 B2 * | 9/2014 | Kirkpatrick | 345/863 |
| 8,922,479 B2 * | 12/2014 | Pennington, II | G06F 3/04883 345/156 |
| 8,984,436 B1 * | 3/2015 | Tseng | G06F 1/1624 345/173 |
| 2001/0012437 A1 * | 8/2001 | Yamamoto | 386/55 |
| 2002/0032705 A1 * | 3/2002 | Higashiyama et al. | 707/530 |
| 2002/0059350 A1 * | 5/2002 | Iwema | G06F 3/04883 715/234 |
| 2002/0063740 A1 * | 5/2002 | Forlenza et al. | 345/856 |
| 2002/0143544 A1 * | 10/2002 | Gschwendtner | 704/260 |
| 2002/0156615 A1 * | 10/2002 | Takatsuka et al. | 704/1 |
| 2003/0095135 A1 | 5/2003 | Kaasila et al. | |
| 2003/0103082 A1 * | 6/2003 | Carroll | 345/769 |
| 2004/0019849 A1 * | 1/2004 | Weng et al. | 715/513 |
| 2004/0027398 A1 * | 2/2004 | Jaeger | 345/863 |
| 2004/0056899 A1 * | 3/2004 | Sinclair et al. | 345/800 |
| 2004/0083109 A1 * | 4/2004 | Halonen et al. | 704/277 |
| 2004/0135797 A1 * | 7/2004 | Meier et al. | 345/684 |
| 2004/0179001 A1 * | 9/2004 | Morrison et al. | 345/179 |
| 2004/0225965 A1 * | 11/2004 | Garside et al. | 715/531 |
| 2004/0249627 A1 * | 12/2004 | Mirkin | 704/3 |
| 2005/0008343 A1 * | 1/2005 | Frohlich et al. | 386/121 |
| 2005/0057524 A1 * | 3/2005 | Hill et al. | 345/173 |
| 2005/0193321 A1 * | 9/2005 | Iwema et al. | 715/500 |
| 2005/0204295 A1 * | 9/2005 | Voorhees et al. | 715/747 |
| 2005/0270269 A1 * | 12/2005 | Tokkonen | G06F 3/0236 345/156 |
| 2006/0005151 A1 * | 1/2006 | Altman | 715/860 |
| 2006/0026536 A1 * | 2/2006 | Hotelling et al. | 715/863 |
| 2006/0064640 A1 * | 3/2006 | Forlines et al. | 715/702 |
| 2006/0072137 A1 * | 4/2006 | Nishikawa et al. | 358/1.11 |
| 2006/0119588 A1 * | 6/2006 | Yoon et al. | 345/173 |
| 2006/0132460 A1 * | 6/2006 | Kolmykov-Zotov et al. | 345/173 |
| 2006/0197756 A1 * | 9/2006 | Sun | 345/179 |
| 2006/0253803 A1 * | 11/2006 | Backlund | 715/856 |
| 2006/0256088 A1 * | 11/2006 | Kong | 345/168 |
| 2007/0061753 A1 | 3/2007 | Ng et al. | |
| 2007/0125633 A1 * | 6/2007 | Boillot | 200/52 R |
| 2007/0229466 A1 * | 10/2007 | Peng et al. | 345/173 |
| 2007/0234235 A1 * | 10/2007 | Scott | 715/825 |
| 2007/0260981 A1 | 11/2007 | Kim et al. | |
| 2007/0294644 A1 * | 12/2007 | Yost | 715/856 |
| 2008/0048997 A1 * | 2/2008 | Gillespie et al. | 345/174 |
| 2008/0084400 A1 * | 4/2008 | Rosenberg | 345/173 |
| 2008/0148177 A1 * | 6/2008 | Lang et al. | 715/784 |
| 2008/0165141 A1 * | 7/2008 | Christie | G06F 3/044 345/173 |
| 2008/0165142 A1 * | 7/2008 | Kocienda et al. | 345/173 |
| 2008/0174570 A1 * | 7/2008 | Jobs et al. | 345/173 |
| 2008/0184290 A1 * | 7/2008 | Tapuska | 725/37 |
| 2008/0195979 A1 * | 8/2008 | Souza et al. | 715/856 |
| 2008/0259040 A1 * | 10/2008 | Ording et al. | 345/173 |
| 2008/0309632 A1 * | 12/2008 | Westerman et al. | 345/173 |
| 2009/0049398 A1 * | 2/2009 | Ahn | 715/780 |
| 2009/0058830 A1 * | 3/2009 | Herz et al. | 345/173 |
| 2009/0087095 A1 * | 4/2009 | Webb | 382/189 |
| 2009/0109182 A1 * | 4/2009 | Fyke et al. | 345/173 |
| 2009/0113353 A1 * | 4/2009 | Bansal et al. | 715/856 |
| 2009/0187846 A1 | 7/2009 | Paasovaara | |
| 2009/0189862 A1 * | 7/2009 | Viberg | 345/168 |
| 2009/0204888 A1 * | 8/2009 | Miyamoto | 715/243 |
| 2009/0217158 A1 * | 8/2009 | Bailey | 715/255 |
| 2009/0228792 A1 * | 9/2009 | van Os et al. | 715/702 |
| 2009/0228842 A1 * | 9/2009 | Westerman et al. | 715/863 |
| 2009/0237421 A1 | 9/2009 | Kim et al. | |
| 2009/0249232 A1 * | 10/2009 | Lundy et al. | 715/764 |
| 2009/0249627 A1 * | 10/2009 | Bove et al. | 715/858 |
| 2010/0066764 A1 * | 3/2010 | Refai | 345/660 |
| 2010/0159892 A1 | 6/2010 | Dunnam et al. | |
| 2010/0171713 A1 * | 7/2010 | Kwok et al. | 345/173 |
| 2010/0205575 A1 * | 8/2010 | Arora | G06F 17/5068 716/122 |
| 2010/0235726 A1 * | 9/2010 | Ording et al. | 715/234 |
| 2010/0235729 A1 * | 9/2010 | Kocienda et al. | 715/255 |
| 2010/0245261 A1 * | 9/2010 | Karlsson | 345/173 |
| 2010/0295798 A1 * | 11/2010 | Nicholson et al. | 345/173 |
| 2010/0302281 A1 * | 12/2010 | Kim | 345/661 |
| 2010/0313126 A1 * | 12/2010 | Jung et al. | 715/702 |
| 2010/0328209 A1 * | 12/2010 | Nakao | 345/157 |
| 2010/0328317 A1 * | 12/2010 | Lindfors | 345/468 |
| 2011/0010668 A1 * | 1/2011 | Feldstein et al. | 715/822 |
| 2011/0029917 A1 | 2/2011 | Um | |
| 2011/0035209 A1 * | 2/2011 | MacFarlane | 704/9 |
| 2011/0080341 A1 * | 4/2011 | Helmes et al. | 345/163 |
| 2011/0109581 A1 | 5/2011 | Ozawa et al. | |
| 2011/0134029 A1 * | 6/2011 | Park et al. | 345/157 |

(56) References Cited

U.S. PATENT DOCUMENTS

| | | | | |
|---|---|---|---|---|
| 2011/0157028 | A1* | 6/2011 | Stallings et al. | 345/173 |
| 2011/0310026 | A1* | 12/2011 | Davis et al. | 345/173 |
| 2012/0306772 | A1* | 12/2012 | Tan | G06F 3/04842 345/173 |

OTHER PUBLICATIONS

Stoup, "The New 12" MacBook will have an iPhone-Like Interface," Published Date: Jan. 17, 2007, <http://www.applematters.com/article/the-new-12-macbook-will-have-an-iphone-like-interface/>, 7 pages (retrieved Jan. 22, 2010).

"My-T-Touch for Windows Indestructible Keyboards and Indispensable Utilites, Version 1.78, Release 4, User's Guide," Released Date: Nov. 24, 2009, <http://www.imgpresents.com/myttouch/guide/mtta4.pdf, 187 pages (retrieved Jan. 22, 2010).

Apple, "Vision," <http://www.apple.com/accessibility/iphone/vision.html>, 8 pages, Accessed Aug. 9, 2011.

"iPhone OS 3.0: How to cut, copy and paste text and images," <http://www.iphonic.tv/2009/06/iphone_os_30_how_to_cut_copy_a.html>, accessed Jun. 18, 2010, 11 pages.

Microsoft Office, "Select text by using the mouse," <http://office.microsoft.com/en-us/word-help/select-text-HA010096402.aspx#BM1>, accessed Jun. 18, 2010, 4 pages.

Olwal et al., "Rubbing and Tapping for Precise and Rapid Selection on Touch-Screen Displays," Proceedings of CHI 2008 (SIGCHI Conference on Human Factors in Computing Systems), Florence, Italy, Apr. 5-10, 2008, pp. 295-304.

PCWorld, "Magnifying Glass Pro description, Database Downloads List by 30 Day Change," <http://www.pcworld.com/downloads/file/fid,71819-order,4-c,database/description.html>, Added Feb. 1, 2010, pp. 1-4, Downloaded Mar. 31, 2011.

Ramos et al., "Zliding: Fluid Zooming and Sliding for High Precision Parameter Manipulation," UIST '05, Oct. 23-27, 2005, pp. 143-152.

ThomasNet News, "Touch Sensor Features Gesture Recognition Technology," <http://news.thomasnet.com/fullstory/543504>, Published Date: Apr. 28, 2008, 3 pages.

"Virtual On-Screen Keyboard for any Taste," <http://hot-virtual-keyboard.com/>, Published Date: Dec. 15, 2009, 1 page.

European Search Report received for European Patent Application No. 12822739.4, Mailed: Oct. 30, 2014, 3 Pages.

Office Action received for European Patent Application No. 12822739.4, Mailed: Nov. 18, 2014, 5 Pages.

* cited by examiner

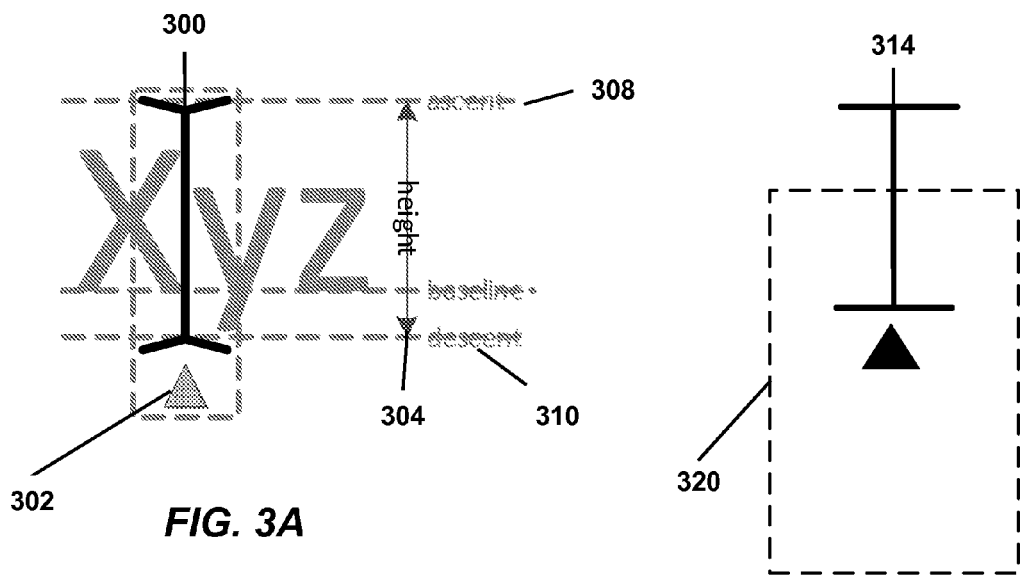
FIG. 3A
FIG. 3B
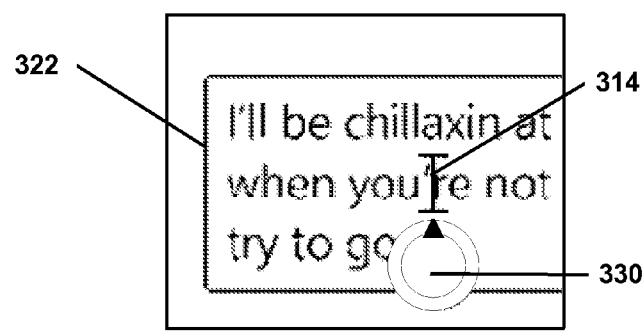
FIG. 3C

FIG. 5A  FIG. 5B

SOFTWARE 1190 IMPLEMENTING
POINTER TOOL USER INTERFACE

POINTER TOOL WITH TOUCH-ENABLED PRECISE PLACEMENT

FIELD

The disclosed embodiments relate generally to user interfaces, and more particularly to a pointer tool for a user interface.

BACKGROUND

With the increasing popularity of mobile devices, including cellphone devices, handheld devices, handheld computers, smartphones, PDAs, etc., there is a need for improving the user interface experience by increasing user input entry speed, reducing entry errors, and improving the overall user experience.

Mobile devices with capacitive or resistive touch capabilities are well known. Modern mobile phones have evolved over recent years to the point where they now possess a broad range of capabilities. They are not only capable of placing and receiving mobile phone calls, multimedia messaging (MMS), and sending and receiving email, they can also access the Internet, are GPS-enabled, possess considerable processing power and large amounts of memory, and are equipped with high-resolution color liquid crystal displays capable of detecting touch input. As such, today's mobile phones are general purpose computing and telecommunication devices capable of running a multitude of applications. For example, modern mobile phones can run web browser, navigation system, media player and gaming applications.

Along with these enhanced capabilities has come a demand for larger displays to provide a richer user experience. Mobile phone displays have increased in size to the point where they can now consume almost the entire viewing surface of a phone. To increase the size of displays any further would require an increase in the size of the phones themselves. Even with the display size being at its maximum, the content on the display remains relatively small.

Indeed, a finger touching the display can obfuscate the very content being manipulated, making precise operations difficult. For example, moving an insertion point in text often requires a user to grab and drag an insertion cursor. However, the cursor is small relative to a user's finger and often positioned amongst other characters. As a result, the touch screen needs to decide whether the user is attempting to grab the cursor or select the surrounding text. With the user's finger covering both the cursor and text simultaneously, it is impossible to know what operation is being attempted. As a result, the user interface often provides inconsistent results, which causes user frustration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The above deficiencies and other problems associated with interacting with touch screen displays are reduced or eliminated by the disclosed pointer tool. The claimed subject matter is not limited to implementations that solve any or all of the noted disadvantages.

The pointer tool allows an insertion point of text to be interactively changed and manipulated by a user. In one embodiment, the pointer tool can be activated (such as by a press-and-hold operation) on the user interface display. When activated, the pointer tool can be automatically positioned adjacent the user's finger regardless of the location of a current cursor. In the activated mode, the pointer tool can be free floating on the user interface and can move with the user's finger to create an insertion point for entering information. Once the user moves the pointer tool to the desired location, the user can remove his or her finger from the display and the pointer tool can persist on the user interface. As such, the user can re-grab the pointer tool (without the need to reactivate it) and move it to a different location. Once the user enters editing information or re-taps the display, the pointer tool can be automatically removed from the display.

In another embodiment, the pointer tool can be an enlarged "I" beam that is greater in size than text on the user interface. Additionally, a triangle or other symbol can be associated with the I-beam and located near the bottom thereof to weight the pointer tool and to prompt the user to grab the pointer tool at the bottom so as not to obfuscate the content being manipulated.

In yet another embodiment, the pointer tool can automatically switch between two modes of operation: a free floating mode wherein the pointer tool can move wherever the user's finger is located and independently of content (e.g., the pointer tool can float over the top of text); and a notched mode wherein the pointer tool can only move to possible cursor positions and, consequently, is dependent upon content. For example, when a user's finger is within a predetermined distance from a candidate cursor location, the pointer tool automatically changes to the notched mode wherein the pointer tool can move to potential cursor locations so it does not overlap with text.

In still a further embodiment, the user can move the pointer tool near a boundary of the display in order to initiate an auto-scrolling mode wherein text outside of a visible area can be automatically scrolled into view.

The foregoing and other features, and advantages will become more apparent from the following detailed description, which proceeds with reference to the accompanying figures.

BRIEF DESCRIPTION OF THE DRAWINGS

FIG. 3A illustrates an embodiment of a pointer tool graphic.

FIG. 3B illustrates an embodiment of a pointer tool hit target.

FIG. 3C illustrates an embodiment of a notched pointer tool.

FIGS. 5A-5B illustrate an embodiment of a pointer tool transitioning from floating mode to notched mode.

DETAILED DESCRIPTION

Reference will now be made in detail to embodiments, examples of which are illustrated in the accompanying drawings. In the following detailed description, numerous specific details are set forth in order to provide a thorough understanding of the embodiments described herein. However, it will be apparent to one of ordinary skill in the art that the embodiments may be practiced without these specific details. In other instances, well-known methods, procedures, components, and circuits have not been described in detail so as not to unnecessarily obscure aspects of the embodiments.

Figure 1A:
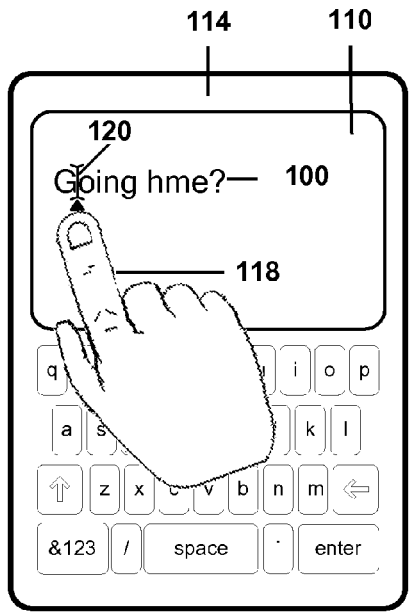
FIGS. 1A-1D illustrate an embodiment of using a pointer tool to edit data.
Figure 1B:
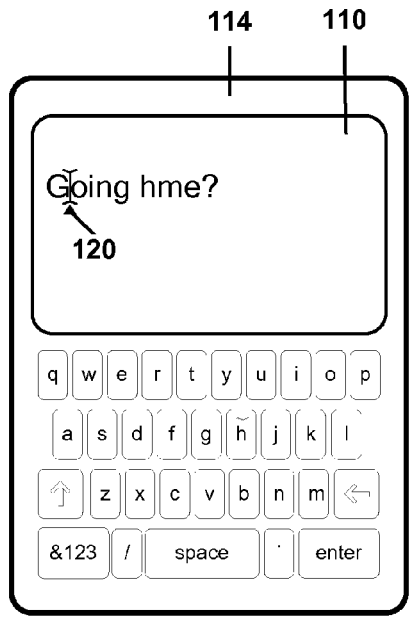
Figure 1C:
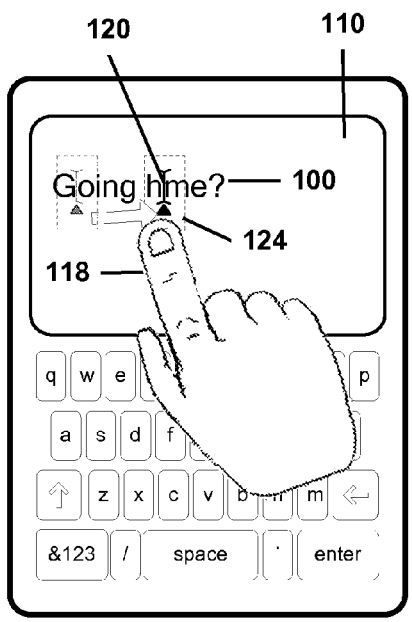
Figure 1D:
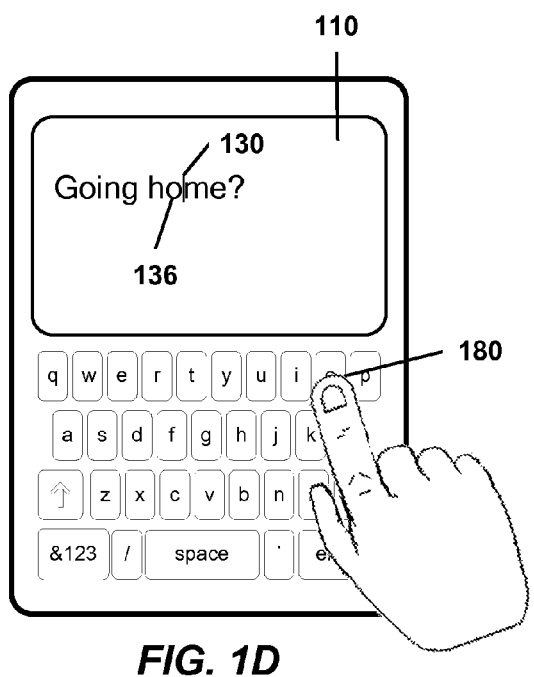

Accordingly, FIGS. 1A-1D illustrate one embodiment for implementing a pointer tool. FIG. 1A shows text 100 entered into display 110 on a mobile device touch sensitive screen 114. Also, FIG. 1A shows a finger 118 contacting the touch screen 114 and activating pointer tool 120 at a precise point in the text. Notably, the user can touch anywhere in the text to activate the pointer tool regardless of the current location of a cursor. Additionally, the pointer tool 120 is shown as an enlarged "I" beam that is sized to be larger than the text. Additionally, the I-beam has a triangle at the lower end thereof to weight the I-beam and prompt the user to grab below the I-beam. FIG. 1B illustrates an example of the pointer tool persisting in the display 110 after finger contact with the touch screen 114 is removed. FIG. 1C shows an example of finger 118 re-grabbing the pointer tool within a hit target 124 and moving or dragging the pointer tool 120 to a cursor position insertion point in the text string 100. In this example, the pointer tool is moved by dragging finger 118 and moving the contact point with the touch screen 114. FIG. 1D shows an example of the pointer tool removed from the display and replaced by a cursor 130 at its last location, when editing data 136 is entered into the display 110.

Figure 2:
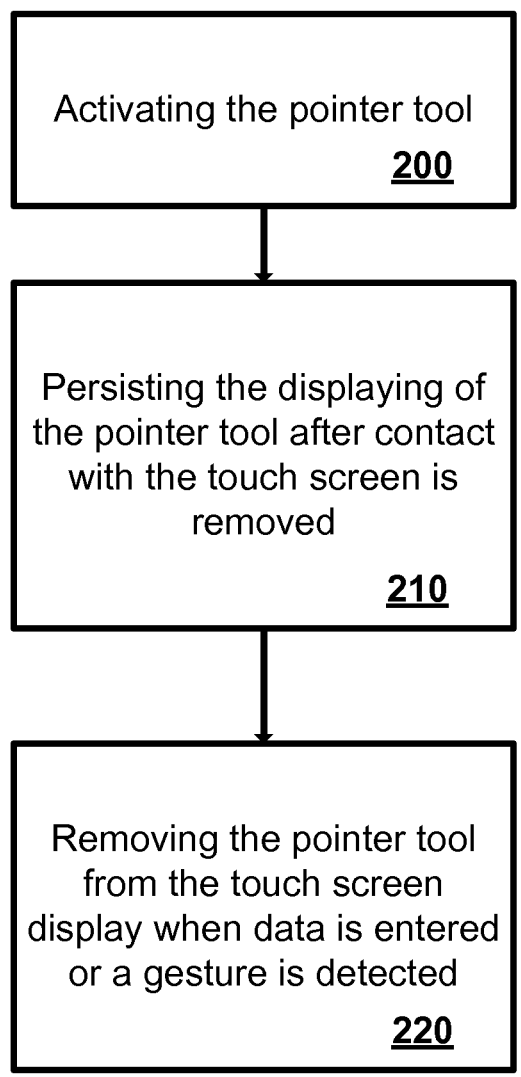
FIG. 2 is a flow diagram illustrating an embodiment of using a pointer tool.

FIG. 2 is a flowchart of a method that illustrates using a pointer tool. In various implementations, the illustrated process blocks may be merged, divided into sub-blocks, or omitted. At block 200 the pointer tool is activated. For example, the pointer tool can be implemented as a floating user interface element that comes up near the top edge of a user's finger, in response to when the user presses and holds on a touch screen. When floating, the pointer tool can appear anywhere in the user interface, including overlapping with text or wherever a cursor can be displayed. For example, the pointer tool, upon activation, may be located at any position within a body of text. Also, the pointer tool can be displayed in an edit control, text editing box, data entry screen, input data field, editable text field, or menu screen. The pointer tool can also be activated in some other manner, such as through pressing a button, key, menu item, or through voice activation, detected device movement, or a camera detected gesture. The cursor can disappear upon pointer tool activation or continue to be displayed. The distance from the contact point with the touch screen and the edge of the pointer can be a predetermined distance, such as a specific number of pixels (e.g. 40 pixels). Also, the pointer tool can be activated in a display and can be independent of the location of a cursor, which enables users to precisely place the pointer tool without having to grab a cursor. However, the pointer tool can include a cursor or activate relative to a cursor's location. In some embodiments, the activation of the pointer tool can be animated or not, and can play a sound upon activation. The pointer tool, upon activation or otherwise, desirably does not magnify or displace surrounding text or data, although it can do so. In another embodiment, contact would not have to be made on text to activate the pointer tool. For example, the pointer tool can be activated in the display where there is no text or entered data. In one embodiment activating the pointer tool can change functionality or the display of other areas. For example, the pointer tool can be active at the same time as other user interface elements. For example, the pointer tool can be active in a text entry area of the user interface at the same time that a keyboard is open. If a user types or accidentally hits a key on the keyboard, then the input can be ignored. Contact can be made with a finger, stylus, or some other object. Alternatively, the pointer tool can be activated, for example, upon detecting a gesture such as a press and hold, tapping, swiping, or panning.

At block 210 the pointer tool persists in the display after contact with the touch screen is removed, such as on a finger up. For example, the pointer tool continues to be displayed until removed. While persisting in the display the pointer tool can be re-grabbed. For example, the user can grab the pointer tool again by contacting the display near the pointer tool without re-activating the pointer tool. For example, the pointer tool can be re-grabbed by detecting contact with a touch screen within a hit target or area surrounding the pointer tool. When the pointer tool is grabbed it can be relocated. For example, after re-grabbing the pointer tool, the user's finger is dragged and the pointer tool follows the contact movement. Also, for example, the pointer tool can be relocated to an insertion point in an input data field. Additionally, the pointer tool can be moved between sections of the display. In one embodiment, the distance between the point of contact with the touch screen and the pointer tool location can be set at a certain distance (e.g. 40 pixels). Thus, the user can grab the pointer tool even though the user touches the screen within a predetermined distance from the pointer tool. In other embodiments, the pointer tool can be relocated through detecting a user command. For example, a user command could be a voice command, a camera detected gesture, or detected device movement.

The pointer tool can be placed at character level precision when relocated. For example, the pointer tool can be placed before or after any character. Also, for example, when in floating mode, upon releasing contact, such as a finger up, the pointer tool can be automatically re-positioned with character level precision, meaning the pointer tool can be automatically repositioned to a possible cursor location. After being re-positioned, the pointer tool can move in character increments.

In other embodiments, relocating the pointer tool in text allows for the generation of suggestions based on the location of the pointer tool. For example, in one embodiment, if the pointer tool is moved to the middle of a word, word suggestions can be generated based on the letters before the pointer tool location. Also, in other embodiments the suggestions can be generated in some other manner, and suggestions can be generated for multiple languages. Also, suggestions can be text strings, characters or addresses.

Removing the pointer tool from the touch screen display when data is entered or a gesture is detected is shown in block 220. For example, a gesture can be a defined and bounded motion by a user such as a tap on the screen, a flick, a pan, or some other motion. Also, for example, data can be entered by typing or selecting text. The data can be editing data. The data can be entered by a keyboard either on screen or hardware, through curve drawing, handwriting, or some other input method. An on-screen keyboard may have a variety of keys that can be selected with contact with the touch screen. Also, an on screen keyboard can be displayed simultaneously with the pointer tool. In some embodiments, the removal of the pointer tool can be animated and/or play a sound upon removal. In another example embodiment, the pointer tool can be removed if not re-grabbed in a predetermined period of time. Also, in another embodiment, the pointer tool, can be removed if an on screen keyboard is closed manually. In one embodiment, when the pointer tool is removed from the display, a cursor appears in the display where the pointer tool was located.

FIG. 3A is a diagram that shows an exemplary embodiment of a pointer tool graphic. For example, the pointer tool graphic can be an I-beam 300 with a triangle 302 or some other symbol adjacent to its bottom edge. The height 304 of the I-beam, for example, can be the distance between the top point on the ascender 308 for text in an editable text field and a descender 310. In FIG. 3A, the height of the I-beam is greater than the text to increase visibility. However, the height can vary depending on the particular application, and can even change with usability. The size of the triangle 302 can also vary. In additional embodiments, the pointer tool can be visually weighted towards the lower end to indicate where it is able to be grabbed so that it can be used such that text being manipulated by the user is not obscured. For example, the pointer tool can be an arrow, a triangle and cursor, triangle, or other symbol. In other embodiments, the pointer tool can have a large handle so that the pointer tool can be easily grabbed from below. For example, the triangle gives the user a visual indicator of where to grab the pointer tool. In some embodiments, the pointer tool is grabbable from below such that a user's finger does not obfuscate text or data being manipulated.

FIG. 3B illustrates an embodiment of a pointer tool 314 with a hit target 320. For example, the hit target 320 can indicate an area where the pointer tool can be grabbed or interacted with by contact with a touch screen. Thus, if the user touches anywhere within the hit target, the pointer tool 314 is automatically grabbed. The size of the hit target can vary depending on the application. For example, the hit target height, in one embodiment, can be half the height of the I-beam plus the height of the triangle plus a number of display pixels. The hit target width can be, for example, the width of the triangle plus 2 mm to the left and right. Also, for example, the hit target 320 can be larger than the pointer tool. The hit target 320 need not be visible to the user.

FIG. 3C illustrates an embodiment of a notched pointer tool. In FIG. 3C text is displayed into an edit field 322, and pointer tool 314 is notched in a cursor position. By notching, the pointer tool is not in a free-floating mode above the text, but rather moves to positions between the text where a cursor can be located. Contact can be made at contact area 330 within the hit target to grab the pointer tool 314.

Figure 4A:
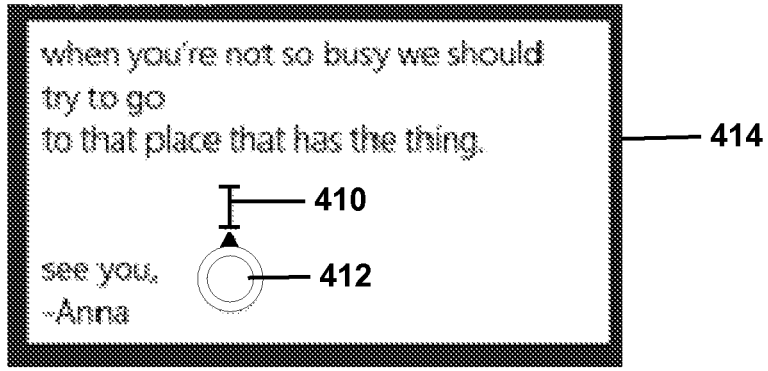
FIGS. 4A-4C illustrate embodiments of a pointer tool as it moves in a user interface.
Figure 4B:
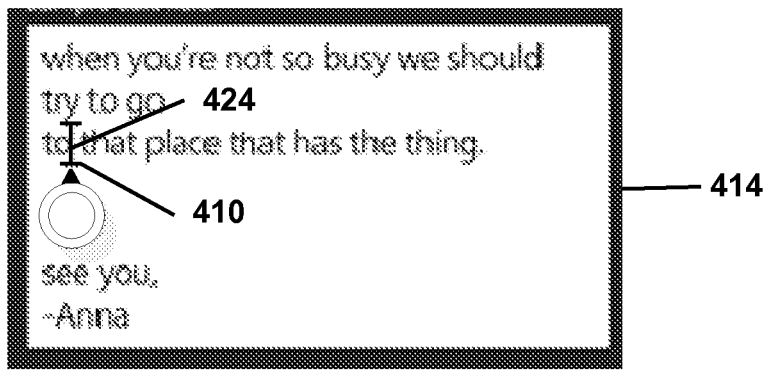
Figure 4C:
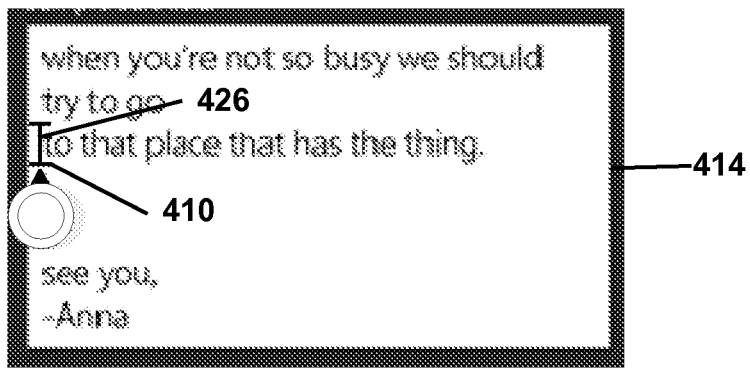

Attention is now directed to FIGS. 4A-4C. FIGS. 4A-4C depict an example embodiment of a pointer tool moving according to one mode of operation. For example, at FIG. 4A the pointer tool 410 moves according to a floating mode and moves in a floating fashion. In floating mode, for example, the pointer tool moves with an area of contact 412 in the touch screen 414, and is independent of text location. For example, in floating mode the pointer tool can move so as to overlap with the text or can move in an area where there is no text at all. The pointer tool can be activated as floating when a press and hold occurs in a location such that the pointer tool is not aligned with text. Thus, in floating mode the pointer tool can be dragged or moved anywhere in a display. For example, the pointer tool can overlap the edge of an edit control, or the screen display edge, so use of the pointer tool is not degraded in those areas.

FIG. 4B shows an exemplary embodiment of the pointer tool transitioning from floating mode to notched mode. For example, in this embodiment, the pointer tool 410 can transition from floating mode to notched mode when the pointer tool enters an area relative to a possible cursor location 424. In one embodiment, when the pointer tool moves within a predetermined distance of a possible cursor location, the mode switches automatically to notched mode. In another example, the pointer tool 410 can transition from floating mode to notched mode when contact with a device touch screen is removed. For example, the pointer tool can relocate and notch to the closest possible cursor position.

FIG. 4C shows an exemplary embodiment of the pointer tool 410 moving according to a notched mode. For example, in this embodiment the pointer tool 410 can move according to a notched mode and move in a notched fashion. In notched mode, for example, the pointer tool 410 moves such that it is always located in a possible cursor position. In this example, pointer tool 412 moves from the cursor location 424 of FIG. 4B to cursor location 426 of FIG. 4C. The selected cursor position is typically the nearest possible cursor position to the finger or pointer tool. The pointer tool can activate, for example, such that it is aligned with text when it appears in the display and is notched at that position. Moving in a notched fashion allows for the pointer tool to move without overlapping text.

Figure 5C:
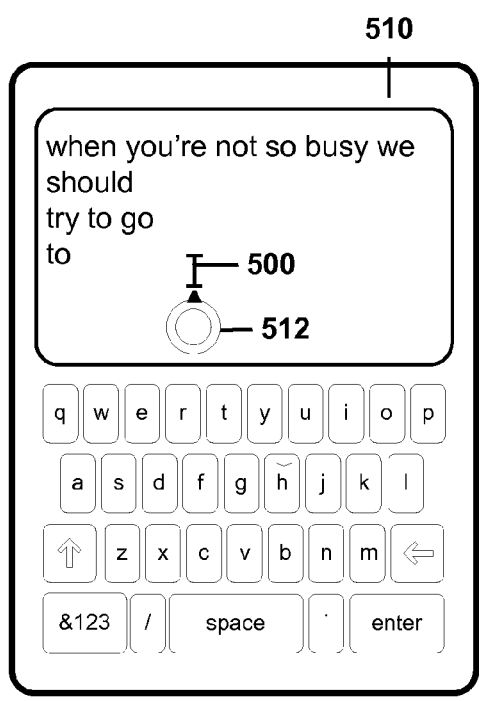
FIG. 5C illustrates an embodiment of a pointer tool transitioning to notched mode.
Figure 5C:
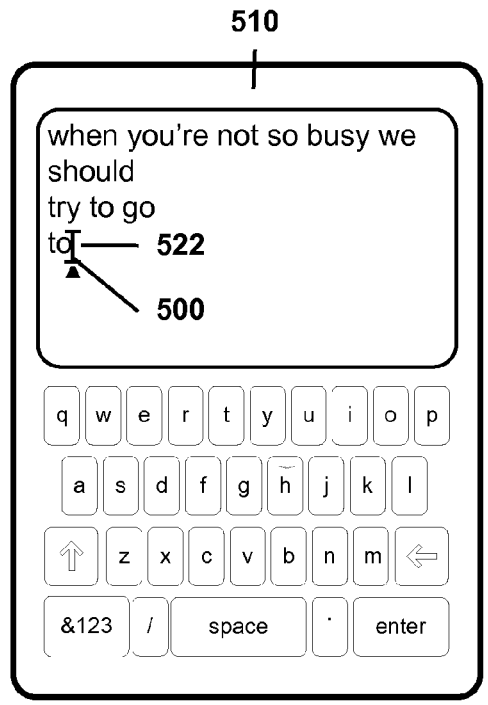
Figure 5C:
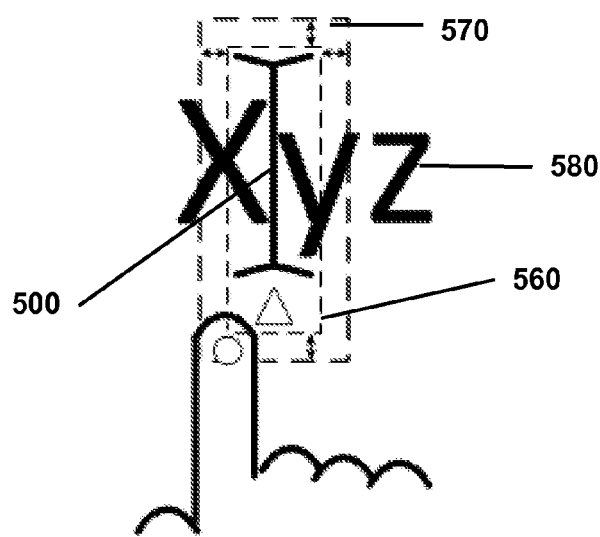

FIGS. 5A-5C show example embodiments of a pointer tool transitioning to notched mode. In the embodiment of FIG. 5A, pointer tool 500 is activated in floating mode in touch screen 510, by making contact with the touch screen 510 at area 512. Notably, the pointer tool is free floating and is positioned where a cursor can not be located. In the embodiment of FIG. 5B, the contact with the touch screen 510 is removed, and pointer tool 500 relocates to the nearest cursor position 522 and transitions to notched mode. In the example embodiment in FIG. 5C, the pointer tool 500 transitions to notched mode when the pointer tool hot spot 560 enters a margin 570 around a possible cursor position in text 580. Thus, when the pointer tool is at a predetermined distance from a potential cursor position, it automatically transitions to the notched mode by monitoring the location of the pointer tool, comparing it to a potential cursor location and calculating a distance between the two. If the distance is less than a predetermined amount the pointer tool is automatically converted to the notched mode and automatically moved to the cursor position.

Figure 6C:
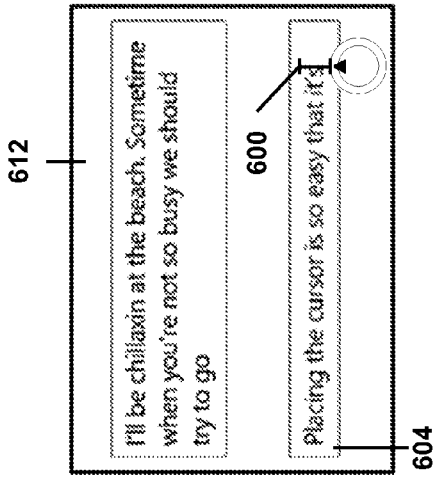
FIGS. 6A-6F illustrate an embodiment of using a pointer tool to manipulate text in a single line edit field.
Figure 6F:
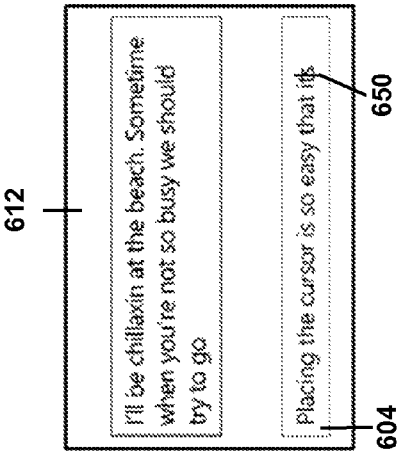
Figure 6B:
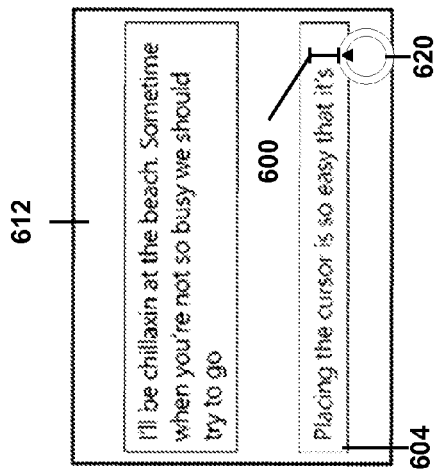
Figure 6E:
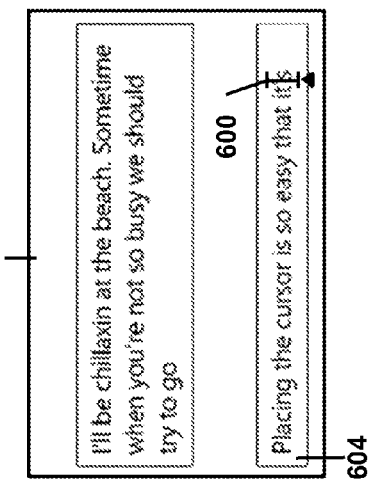
Figure 6A:
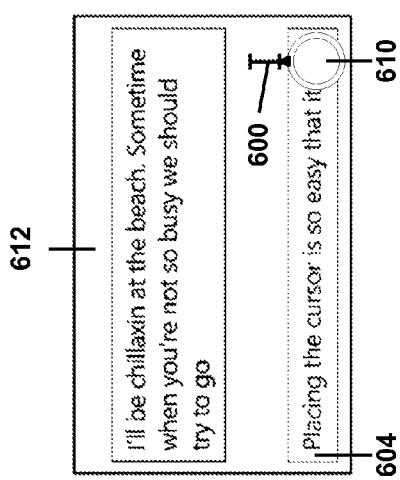
Figure 6D:
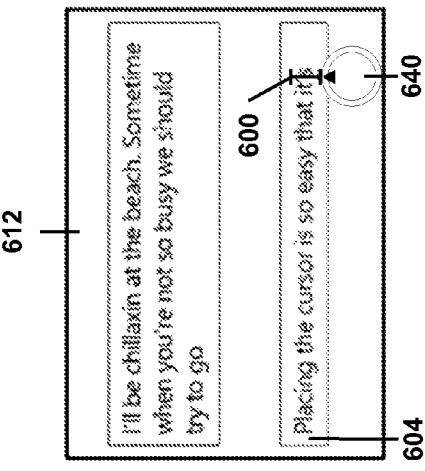

FIGS. 6A-6F show an example embodiment of using the pointer tool to manipulate text in a single line edit field. In FIG. 6A pointer tool 600 can be activated in the single line edit field 604 by making contact with an area 610 of the touch screen 612, which coincides, at least in part, with the edit field 604. In FIG. 6B, the contact can be moved to area 620 and the pointer tool 600 can move in floating mode according to contact movement. In FIG. 6C, the pointer tool 600 can be moved near text in edit field 604 and transitions to notched mode. In FIG. 6D, the pointer tool 600 moves in a notched fashion in the edit field 604 according to contact movement to contact area 640. In FIG. 6E, contact with the touch screen 612 can be removed and pointer tool 600 can persist in the touch screen 612. In FIG. 6F, a cursor 650 appears, and the pointer tool can be removed from the touch screen 612 in response to text being removed from the single line edit field 604. In particular, the word "it's" is changed to "its" and the pointer tool is automatically terminated and replaced with a cursor.

Figure 7A:
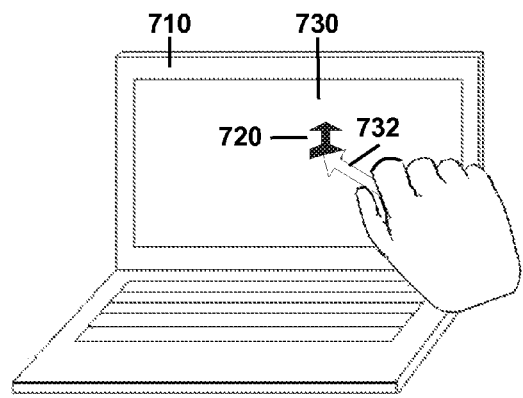
FIG. 7A illustrates an embodiment of a pointer tool being used with a stylus.
Figure 7B:
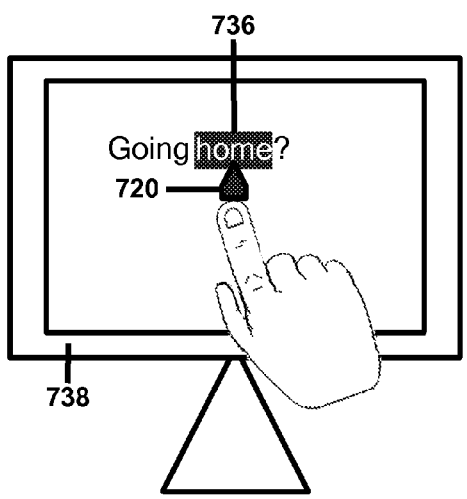
FIG. 7B illustrates an embodiment of a pointer tool used for selecting a word.
Figure 7C:
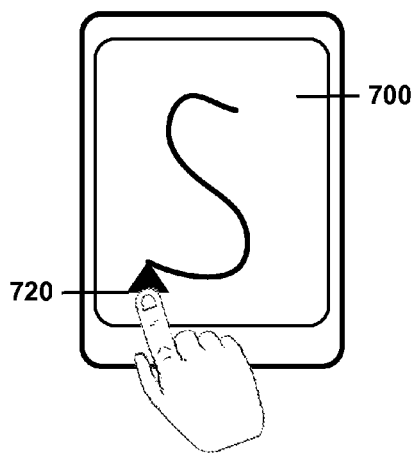
FIG. 7C illustrates an embodiment of a pointer tool used for handwriting on a screen.
Figure 7D:
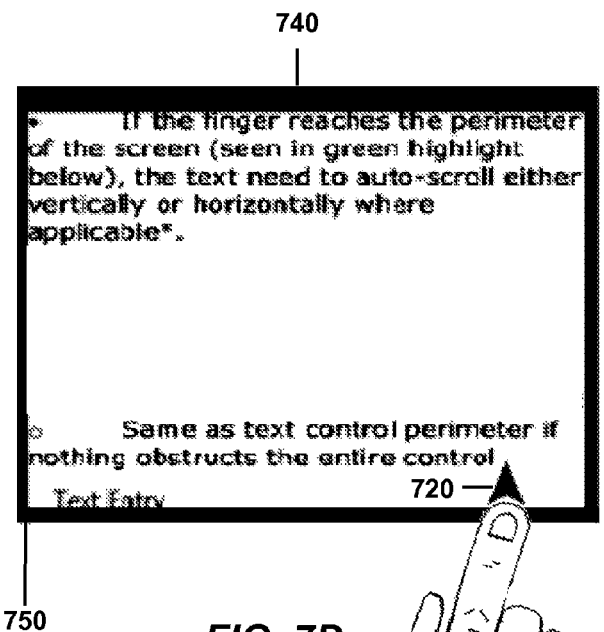
FIG. 7D illustrates an embodiment of a pointer tool being used for scrolling.

FIGS. 7A-7D show additional embodiments of the pointer tool being used in various displays. FIG. 7A shows a computer 710 with pointer tool 720 in touch screen 730 being used with stylus 732. The pointer tool can be displayed in touch screens and screens that are not touch sensitive. The pointer tool 720 can be manipulated with a finger, a stylus, or a joystick. FIG. 7B shows an exemplary embodiment of a pointer tool 720 being used to select a word 736 in a television screen 738. FIG. 7C shows an exemplary embodiment of pointer tool 720 being used for handwriting on a screen 700. In other embodiments the pointer tool 720 can be used for other actions that require precise interaction with a touch screen, because the pointer tool allows for the user to clearly see where the pointer tool is pointing. FIG. 7D shows an embodiment of the pointer tool 720 being dragged to allow scrolling and showing of the complete contents of a text field or edit control 740. The scrolling can be automatic or otherwise. For example, whenever the pointer tool 720 reaches an area relative to (e.g. very close) or around the control edge 750 auto scroll can occur. The auto scroll can scroll vertically (e.g. Up/Down), horizontally (e.g. Right/Left), or some other direction depending upon direction of drag, edge or otherwise.

Exemplary Embodiment for Detecting Contact

Figure 8A:
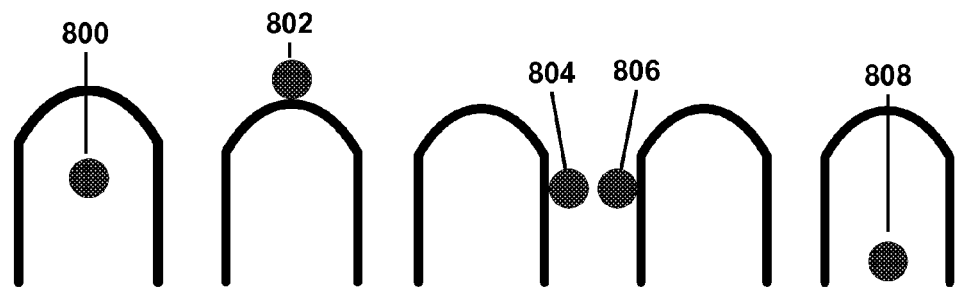
FIG. 8A illustrates various embodiments of hit test points for fingers.
Figure 8B:
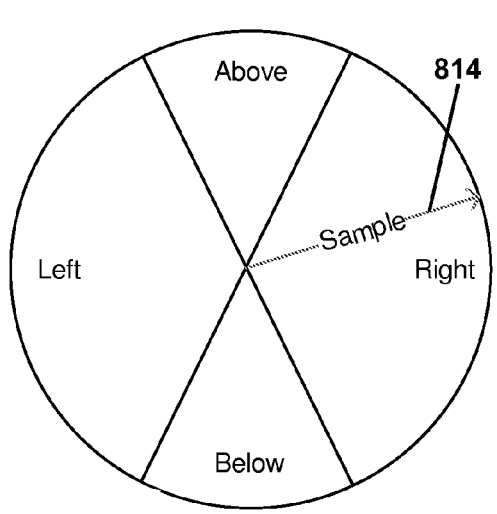
FIG. 8B illustrates an embodiment of a vector used to detect finger movement.
Figure 8C:
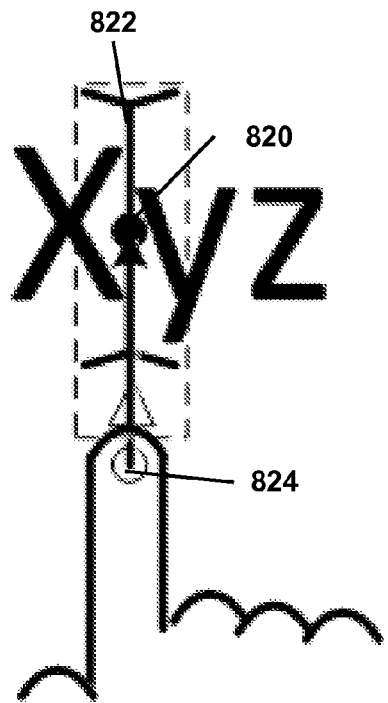
FIG. 8C illustrates an embodiment of a pointer tool hot spot offset from a contact point.

FIGS. 8A-8C show embodiments of tracking contact movement for using the pointer tool. When an end-user is manipulating text, the finger can be used to manipulate the pointer tool. However, as a finger can be wider than the pointer tool, it is desirable to define a contact point associated with a finger. For example, FIG. 8A shows fingers and various contact points. If the center of the finger shown at 800 is used as the contact point for the location in the text range a user is selecting, the finger itself will cover this point. This can prevent the user from seeing feedback as changes are made. Alternatively, a leading edge of a finger's movement can be a contact point 802. If the point that is used to contact is actually to the side of the finger as shown in 804 and 806, then the end-user can see the changes as they are made. In alternative embodiments, the contact point can be the same as the point reported from the touch input system, above or below the finger contact area 802, 808 when the finger is generally moving up or down, to the right or left of the finger when the finger is generally moving to the right or left. In one example embodiment, as shown in FIG. 8B to determine the direction the finger is generally moving one can store three previous points and use the oldest with the current point to calculate a vector 814. This vector can be used to determine what direction the user is moving. FIG. 8C shows an example embodiment of a hot spot 820 relative to pointer tool 822 that can be offset from contact point 824 to be used in hit testing while using pointer tool 822.

Figure 9:
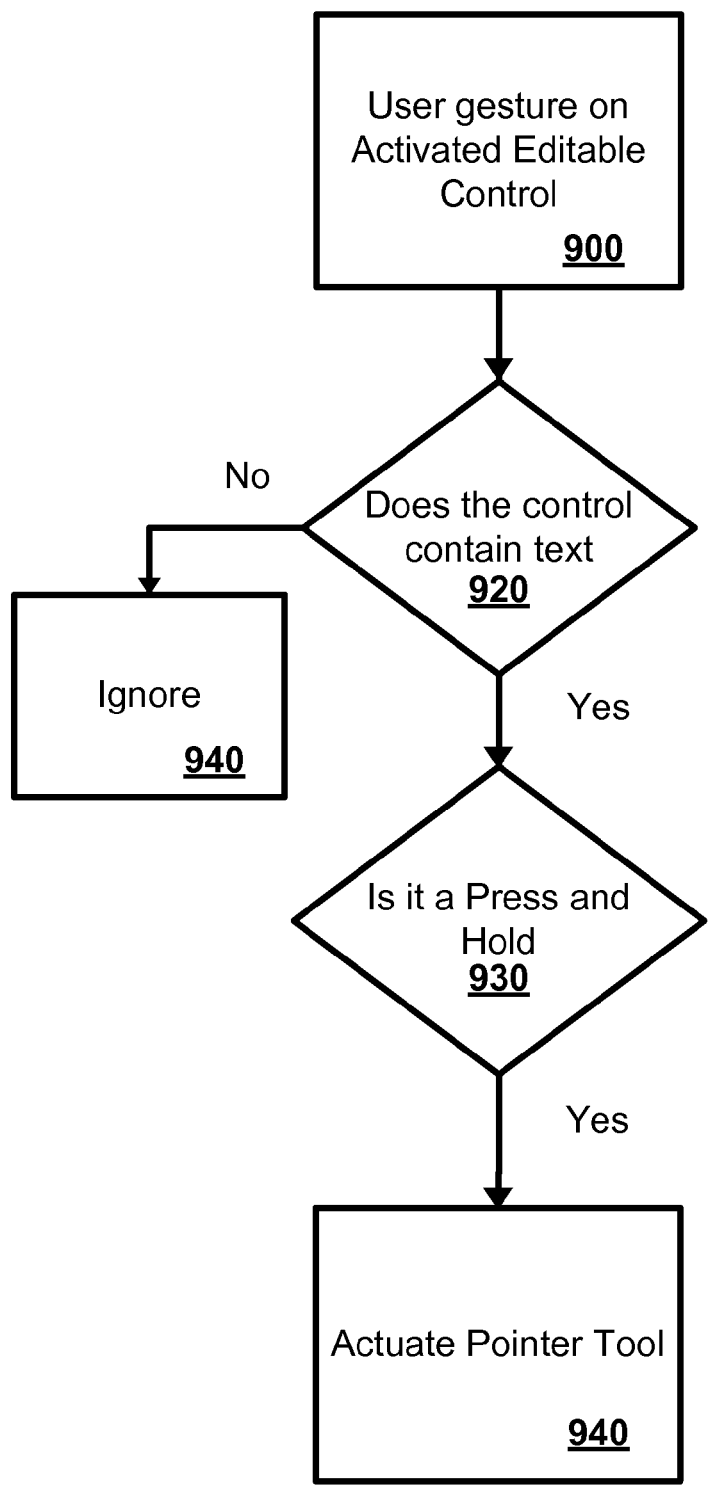
FIG. 9 is a flow diagram that illustrates an embodiment of activating a pointer tool.

FIG. 9 is a flow chart that illustrates an embodiment of activating a pointer tool. In various other implementations, the illustrated process blocks may be merged, divided into sub-blocks, or omitted. At block 900, a user gesture is detected on an activated editable field. At decision block 920 it is decided whether the edit field contains text. If there is text in the edit field, at decision block 930 it is decided if the detected gesture is a press and hold. If the detected gesture is a press and hold then the pointer tool is activated at block 940.

In alternative embodiments, for example, a press and hold gesture can be detected by detecting continuous contact with the touch screen while ignoring some slight movements of the finger within a specified tolerance range thereby interpreting a hold gesture. For example, the hold delay can be set at a duration (e.g. 500 ms). This can be achieved with a gesture engine specifying in a registry key in inch units without regard to dots per inch (DPI) differences, however this can work with various DPI. In another embodiment, upon a user gesture of press and hold, inside an editable field the pointer tool can activate near the top edge of the finger making contact with the touch screen. In a further embodiment, a press and hold on selected text can dismiss a selection and activate a pointer tool. In other embodiments, a press and hold on empty space can cause the pointer tool to activate. Also, for example, a press and hold towards the top most boundary of an edit field may cause the pointer tool to appear overlapping the edit field boundary. If a user, for example, drags a pointer tool on screen outside the edit field with text in the edit field, the pointer tool may follow the finger until finger is let up. In another embodiment, if an edit field is the topmost field in a display, a press and hold towards the top most boundary of the edit field may cause the pointer tool to appear overlapping the screen boundary. Part of a pointer tool may not be visible while overlapping the screen boundary. In another embodiment activating the pointer tool (e.g. via press and hold) in a single line edit field can display the pointer tool overflowing the boundary. If the pointer tool is overflowing the edit field, a user can, for example, drag such that the pointer tool aligns with text.

Exemplary User Scenario

In one exemplary scenario of an embodiment, a user can receive an email from a potential customer asking for a quote. The user can type out a reply with the work breakdown and quote for each item. Before she hits send, the user can re-read the reply and notice that one of the work items has the wrong quote; instead of $527 the user should have typed $5027. The user puts her finger on the figure and press and holds down. The user can then view a pointer tool appearing near her finger and follows her finger as she moves it around. The user can align the pointer tool to a cursor position that is after the digit "2". Keeping her finger down, the user can drag it to the left and see the pointer tool move in real time and without changing the appearance of the text. As soon as the pointer tool is located before the digit "2" the user can stop dragging and lift her finger. The user can then press a Backspace key on the on-screen keyboard to delete the digit "0". The pointer tool then can disappear and a cursor can take the position of the pointer tool in the display.

Exemplary Advantages

The following describes exemplary advantages of various embodiments. For example, the pointer tool can provide an improved way to precisely interact with touch sensitive displays. According to some embodiments, the pointer tool offers the user an intuitive way of moving a cursor or setting a target in a composition string through direct manipulation with a finger without causing occlusion of manipulated text. Another advantage, for example, of an embodiment of a pointer tool is that it enables a user to place a cursor without having to grab the existing cursor. Also, the text that can be edited with the pointer tool can be from a soft keyboard or imported from other devices, or some other text source. Furthermore, exemplary embodiments of the pointer tool can be used for precise curve drawing or handwriting in a display. In some embodiments, the pointer tool is weighted toward the bottom to encourage a user to grab it at that end so that the insertion point, where data can be entered, is viewable while the pointer tool is being used. Because the pointer tool does not need to displace or magnify surrounding text the user does not have to change their mental focus to manipulate content, and the usability of the pointer tool is not degraded on the edges of a screen or device. Also, in an exemplary embodiment, the pointer tool can persist in the display so a user can review their work or extend a task without having to reactivate the pointer tool.

Example Mobile Environment

Figure 10:
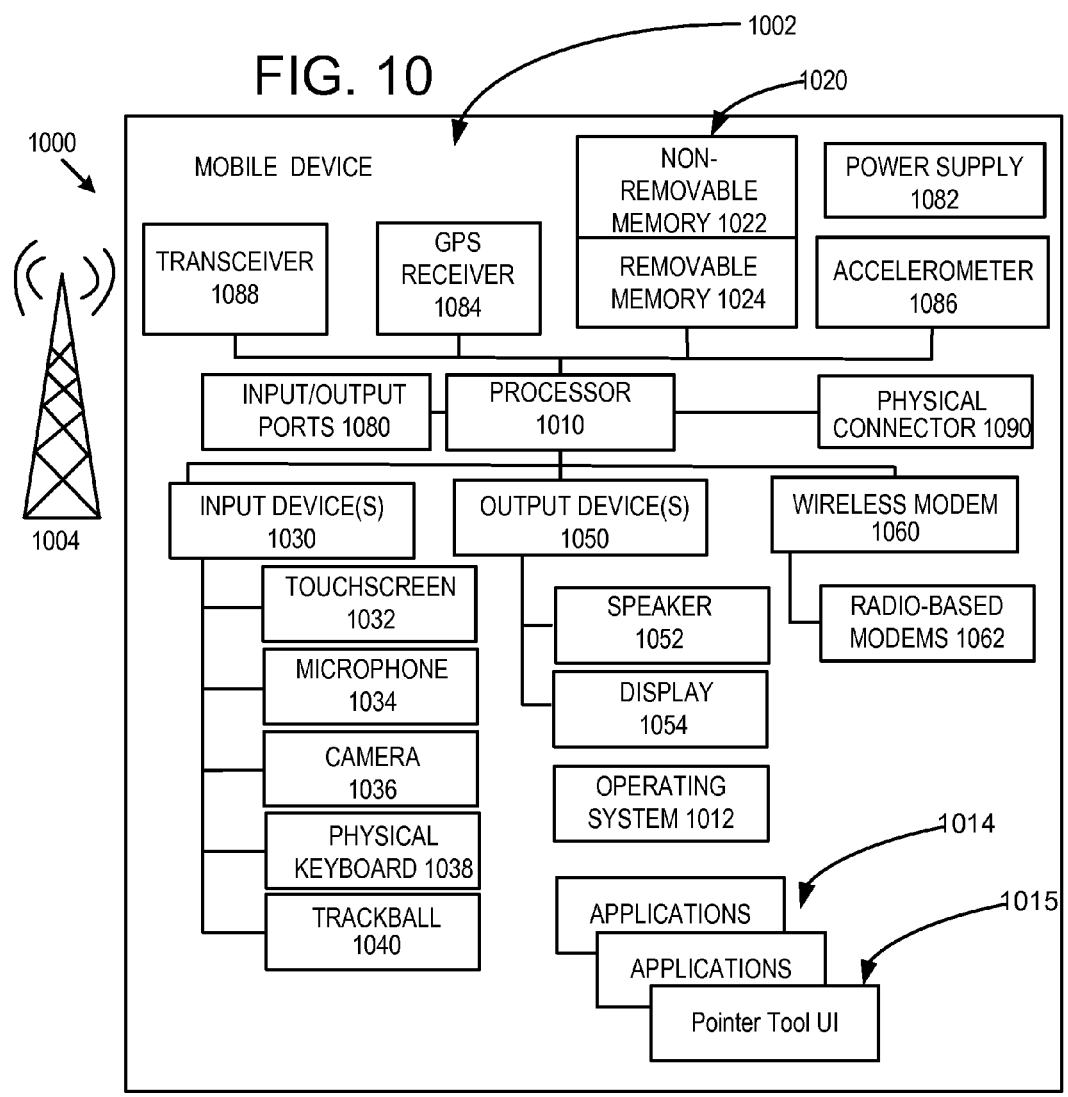
FIG. 10 is a block diagram illustrating an exemplary mobile device.

FIG. 10 is an exemplary mobile device 1000 including a variety of optional hardware and software components, shown generally at 1002. Any components 1002 in the mobile device can communicate with any other component, although not all connections are shown, for ease of illustration. The mobile device can be any of a variety of computing devices (e.g., cell phone, handheld computer, Personal Digital Assistant (PDA), etc.) and can allow wireless two-way communications with one or more mobile communications networks 1004, such as a cellular or satellite network.

The illustrated mobile device can include a controller or processor 1010 (e.g., signal processor, microprocessor, ASIC, or other control and processing logic circuitry) for performing such tasks as signal coding, data processing, input/output processing, power control, and/or other functions for implementing the mobile device. An operating system 1012 can control the allocation and usage of the components 1002 and support for one or more application programs 1014, and support for the pointer tool user interface 1015. The application programs typically include email applications, calendars, contact managers, web browsers, text and media messaging applications.

Memory 1020 can include non-removable memory 1022 and/or removable memory 1024. The non-removable memory 1022 can include RAM, ROM, flash memory, a hard disk, or other well-known memory storage technologies and can be used for storing data and/or code for running the operating system 1012, the applications 1014, and the pointer tool user interface 1015. Example data can include web pages, text, images, sound files, video data, or other data sets to and from one or more network servers or other mobile devices via one or more wired or wireless networks. The removable memory 1024 can include flash memory or a Subscriber Identity Module (SIM) card, which is well known in GSM communication systems, or other well-known memory storage technologies, such as "smart cards." The memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device can support one or more input devices 1030, such as a touch screen 1032, microphone 1034, camera 1036, physical keyboard 1038 and/or trackball 1040, joystick, mouse, and one or more output devices 1050, such as a speaker 1052 and a display 1054. Other possible output devices (not shown) can include piezoelectric or other haptic output devices. Touch screen 1032 can support, an on screen keyboard, edit controls, and the like.

A wireless modem 1060 can be coupled to an antenna (not shown) and can support two-way communications between the processor 1010 and external devices, as is well understood in the art. The modem 1060 is shown generically and can include a cellular modem for communicating with the mobile communication network 1004 and/or other radio-based modems (e.g., Bluetooth or Wi-Fi). The wireless modem 1060 is typically configured for communication with one or more cellular networks, such as a GSM network for data and voice communications within a single cellular network, between cellular networks, or between the mobile device and a public switched telephone network (PSSTN).

The mobile device can further include at least one input/output port 1080, a power supply 1082, a satellite navigation system receiver 1084, such as a Global Positioning System (GPS) receiver, an accelerometer 1086, a transceiver 1088 (for wirelessly transmitting analog or digital signals) and/or a physical connector 1090, which can be a USB port, IEEE 1094 (firewall) port, and RS-232 port. The illustrated components 1002 are not required or all-inclusive, as any components can deleted and other components can be added.

Example Computing Environment

Figure 11:
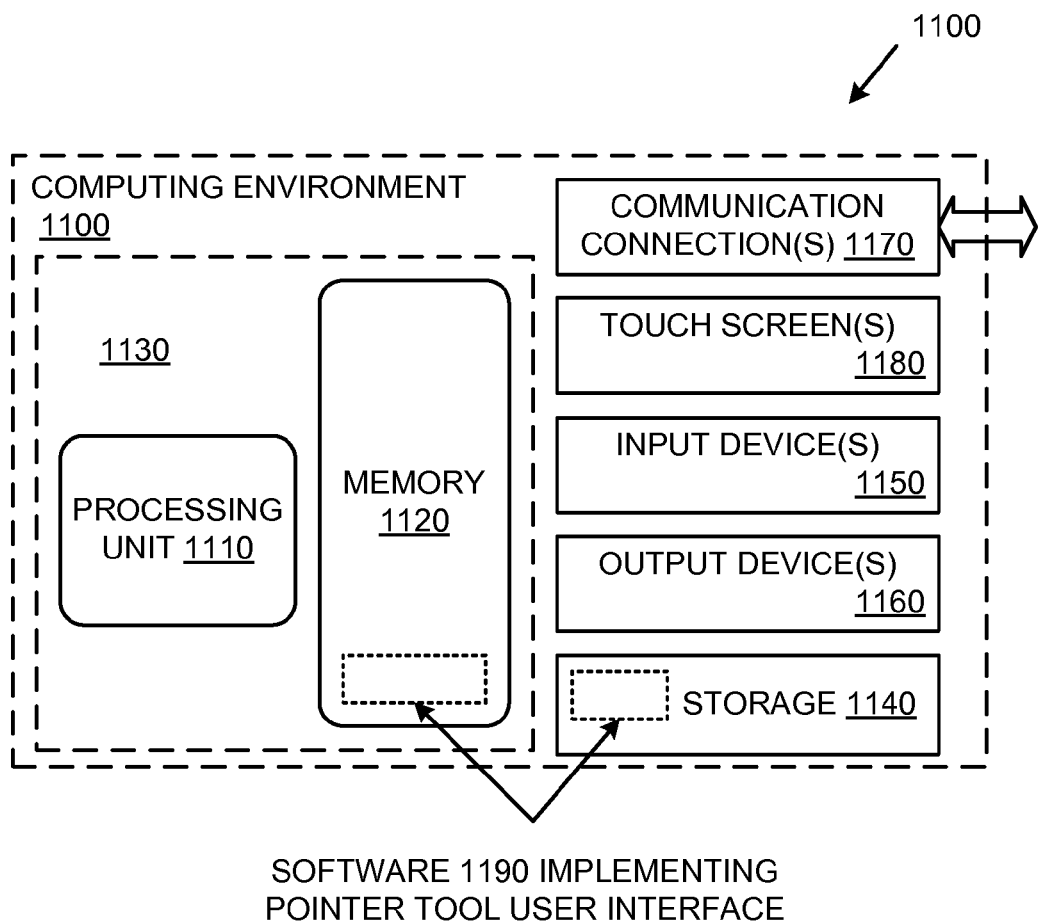
FIG. 11 is a block diagram that illustrates an example of a suitable computing environment for implementing a pointer tool user interface.

FIG. 11 illustrates a generalized example of a suitable computing environment 1100 in which described embodiments, techniques, and technologies may be implemented. For example, the computing environment 1100 can be one of the computing devices (e.g., a mobile device) used to implement the pointer tool 1130.

The computing environment 1100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1190 that can, for example, implement the technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and which can be accessed within the computing environment 1100. The storage 1140 stores instructions for the software 1190, which can implement technologies described herein.

The input device(s) 1150 may be a touch input device, such as a keyboard, keypad, mouse, pen, or trackball, a voice input device, a scanning device, or another device, that provides input to the computing environment 1100. The environment may also have a touch screen 1180 as an input device and display. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1100. By way of example, and not limitation, with the computing environment 1100, computer-readable media include memory 1120, storage 1140, communication media (not shown), and combinations of any of the above.

Computer-readable media are any available media that can be accessed within a computing environment 1100. By way of example, and not limitation, with the computing environment 1100, computer-readable media include memory 1120 and/or storage 1140. As should be readily understood, the term computer-readable storage media includes the media for data storage such as memory 1120 and storage 1140, and not transmission media such as modulated data signals.

Exemplary Architecture

Figure 12A:
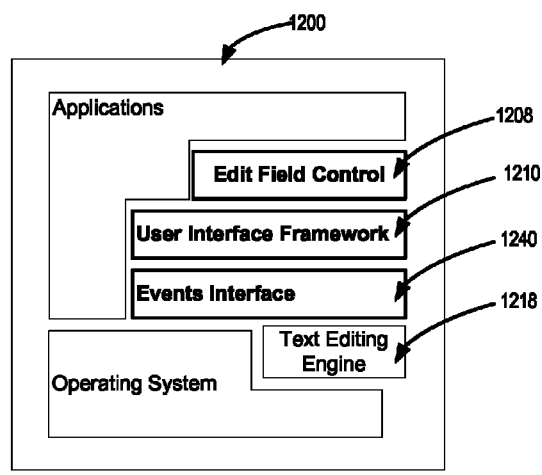
FIG. 12A illustrate a generalized example of a suitable architecture for implementing a pointer tool user interface.

FIG. 12A illustrates a generalized example of a suitable architecture 1200 in which described embodiments, techniques, and technologies may be implemented. Other architectures and implementations can be used also. For example, in FIG. 12A, a device can have an edit field control 1208. The edit field control can build on top of a user interface framework 1210. For example, the edit control can utilize the features of a text editing engine 1218 by using API exposed through objects in the user interface framework 1210, which in turn communicate through an events interface 1240 to a text editing engine 1218. In an example embodiment, text editing engine 1218 is a component that does complex layout and formatting of text, supports editing behaviors, and can provide a windowed/GDI control and a window-less control. The edit field control can implement the pointer tool to allow an end-user to precisely place the pointer tool or interact with a touch screen display. In another embodiment, an API function can allow displaying of the pointer tool at an arbitrary screen coordinate outside of an edit field control.

Furthermore, in one embodiment, a user interface framework can communicate touch input through input handlers. An edit field control can consume a handler that can be modified to communicate touch events to a text editing engine through a touch events interface. The touch events interface can contain a method that can allow the text editing hosts, such as a user interface framework, to forward touch input directly to the touch events interface without the need to directly forward window events.

In another embodiment, a method in a touch events interface to a text editing engine can be implemented to perform selection behavior. For example, selection and pointer tool placement can be modified using selection and pointer tool internal APIs of a text editing engine.

Figure 12B:
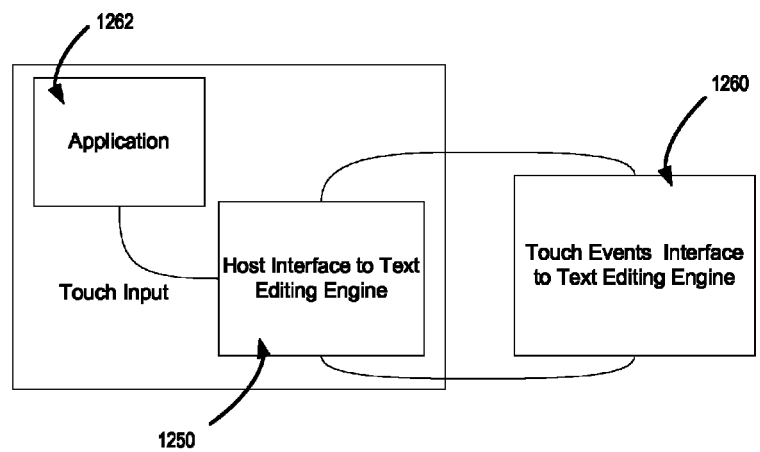
FIG. 12B illustrates an embodiment of a user interface framework using a text editing engine.

FIG. 12B, illustrates an embodiment of using a text editing engine without a window message, which can be used by a user interface framework. In one embodiment, a text editing engine can function through a dual relationship between a host interface 1250 and a touch events interface 1260. Depending on the features needed or used, various versions of these interfaces can exist. The application 1262 (e.g. framework) can implement its own host interface 1250 making calls to and receiving information from the touch events interface 1260. An embodiment using window events can be implemented by a text editing engine implementing the host and an application can create a window type that corresponds with the host.

In an example embodiment, in order to place the pointer tool at the correct location on screen, a text editing engine can communicate with hosts through a client-to-screen method. This communication can allow a user interface framework host to convert between text editing engine coordinates and screen coordinates.

Furthermore in another example embodiment, a host interface can be an interface that a text editing engine exposes for hosts to implement in order for the text editing engine to communicate with the host. For example, a method of the interface can allow hosts to be notified when the pointer tool is updated. For example, it returns OK if the host handles updating the pointer tool, or returns FALSE if the host uses a default implementation of the pointer tool.

In one embodiment, for example, the pointer tool can be implemented by calling HRESULT CaretPlacementArrow (bool visible, bool interactive, int x, int y, int height). For example, the parameters can describe whether to display or hide the pointer tool, whether the pointer tool is being interacted with, screen coordinates for locating the pointer tool, and the height of the pointer tool. In one implementation, to assist in calculations, macros and constants can be defined for update of the pointer tool. For example, the amount of offset from the actual touch point to create the hotspot to be used in hit testing can be defined. Also, for example, when in floating mode or when a line height is not available, the height of the pointer tool can be defined as a default height. Additionally, for example, in one embodiment, a margin around a cursor position that transitions the pointer tool from floating mode to notched mode when the pointer tool hotspot enters the margin can be defined.

Example Alternatives and Combinations

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A computer-implemented method comprising:
   activating a pointer tool in a touch screen display in response to a contact with an area of the touch screen display to display the pointer tool, the pointer tool displayed independent of a location of text in a floating mode such that the pointer tool can be positioned in locations in which a cursor cannot be located, the pointer tool being independent of a location of the cursor and a position of the pointer tool is independent of the text, wherein, in the floating mode, the pointer tool moves in relation to the text without duplication or magnification of the text;
when the pointer tool enters an area that is a predetermined distance relative to a possible cursor position in the text, automatically relocating the pointer tool to notch to the possible cursor position in the text, so as to transition from the floating mode to a notched mode wherein the pointer tool is dependent upon the text;
persisting the displaying of the pointer tool in the touch screen display after the contact with the touch screen display is removed; and
removing the pointer tool from the touch screen display in response to receiving editing data.

2. The computer-implemented method of claim 1 further comprising:
relocating the pointer tool in the touch screen display to an insertion point at character level precision.

3. The computer-implemented method of claim 2,
wherein, in the floating mode, the pointer tool moves in a floating fashion respective to the area of contact with the touch screen display.

4. The computer-implemented method of claim 1,
wherein locating the pointer tool in the touch screen display upon activation is independent of the location of the cursor and both the cursor and the pointer tool are displayed simultaneously.

5. The computer-implemented method of claim 1 further comprising:
re-grabbing the pointer tool without reactivating the pointer tool by detecting a contact with the touch screen display in a hit target area of the pointer tool after the contact with the touch screen display has been removed.

6. The computer-implemented method of claim 1, wherein the pointer tool is visually weighted towards a lower end thereof to indicate an area of the touch screen where the pointer tool is able to be grabbed so that a manipulated text is not obscured.

7. The computer-implemented method of claim 1, wherein the pointer tool comprises one selected from a list comprising: an I-beam, a triangle, an arrow, or an I-beam and triangle.

8. The computer-implemented method of claim 1 further comprising: scrolling the text into view by detecting the pointer tool located in an area relative to an edge of an input data field to scroll through the input data field.

9. The computer-implemented method of claim 1 further comprising: selecting text using the pointer tool.

10. The computer-implemented method of claim 1, wherein the contact with the touch screen display is made with one selected from a list comprising: a stylus, or a finger.

11. A computer-readable storage medium, which is non-volatile, storing computer-executable instructions that cause a computing device coupled to a touch screen to perform a method, the method comprising:
activating a pointer tool in a touch screen display to display the pointer tool in response to a contact with the touch screen display, a location of the pointer tool upon activation being independent of a cursor location and a location of text, the pointer tool movable in a floating mode to locations in the touch screen display in which the cursor cannot be located and locations where the cursor can be located and, in the floating mode, the pointer tool moves in relation to the text without duplication or magnification of the text;
when the pointer tool enters an area that is a predetermined distance relative to an insertion point in the text, automatically relocating the pointer tool in the touch screen display to be notched at the insertion point at character level precision, at least by displaying the pointer tool relative to a contact movement indicating the insertion point, wherein the pointer tool at the insertion point is displayed such that the text in the touch screen display is not overlapped;
persisting the displaying of the pointer tool in the touch screen display after the contact with the touch screen display is removed; and
removing the pointer tool from the touch screen display in response to receiving editing data.

12. The computer-readable storage medium of claim 11, further comprising: wherein, in the floating mode, the pointer tool moves in a floating fashion respective to the area of contact with the touch screen display.

13. The computer-readable storage medium of claim 11, further comprising: re-grabbing the pointer tool by detecting a different contact with the touch screen display; and wherein the pointer tool is visually weighted towards the lower end to indicate an area of the touch screen display where the pointer tool is able to be grabbed so that a manipulated text is not obscured.

14. The computer-readable storage medium of claim 11, further comprising:
wherein the pointer tool comprises an I-beam and a triangle.

15. The computer-readable storage medium of claim 11, further comprising: wherein the pointer tool moves in a notched fashion respective to an area of contact with the touch screen display, wherein moving in the notched fashion comprises locating the pointer tool in possible cursor locations such that the pointer tool does not overlap the text.

16. The computer-readable storage medium of claim 11, further comprising:
wherein the pointer tool moves in a floating fashion respective to an area of contact with the touch screen display until the pointer tool enters the area relative to the insertion point; and
moving the pointer tool in a notched fashion when the pointer tool enters the area relative to the insertion point, wherein moving in the notched fashion comprises locating the pointer tool in possible cursor locations such that the pointer tool does not overlap the text.

17. The computer-readable storage medium of claim 11, further comprising: re-grabbing the pointer tool without reactivating the pointer tool by detecting a different contact with the touch screen display in an area respective of the pointer tool after the contact with the touch screen has been removed.

18. A computer-implemented method comprising:
activating a pointer tool on a touch screen display in response to a contact with an area of the touch screen display that coincides at least in part with a single line edit field, wherein the activating comprises:
detecting a press and hold gesture on a selection of text;
responsive to the detecting of the press and hold gesture on the selection of the text, dismissing the selection of the text; and
responsive to the detecting of the press and hold gesture on the selection of the text, displaying the pointer tool that is independent of a cursor, the pointer tool displayed such that part of the pointer tool is not visible while overlapping a boundary of the touch screen display above the area of a contact with the touch screen display;

moving the pointer tool, in response to a user input, in a free floating mode to a location that the cursor cannot be positioned, the pointer tool movement in the free floating mode being independent of a cursor placement;

when the pointer tool enters an area that is a predetermined distance relative to a first cursor position in an editable text field, automatically relocating the pointer tool in the touch screen display to the first cursor position in the editable text field to be aligned with text at character level precision, at least by moving the pointer tool in the touch screen display relative to a first contact movement indicating the first cursor position in the editable text field, wherein the pointer tool at the first cursor position is displayed so that the text is not overlapped in the editable text field;

wherein the pointer tool moves in a floating fashion without duplication or magnification of the text until the pointer tool enters the area that is the predetermined distance relative to the first cursor position in the editable text field;

moving the pointer tool in a notched fashion when the pointer tool enters the area that is the predetermined distance relative to the first cursor position in the editable text field, wherein moving in the notched fashion comprises locating the pointer tool in possible cursor positions such that the pointer tool does not obscure the text;

persisting the displaying of the pointer tool in the touch screen display after the contact with the touch screen display is removed;

relocating the pointer tool by re-grabbing the displayed pointer tool through a different contact with the touch screen display within a pointer tool hit target area and moving the pointer tool to a second cursor position relative to a second contact movement; and removing the pointer tool from the touch screen display when a text character is entered into the editable text field.

\* \* \* \* \*